July 31, 1951 R. IREDELL, JR 2,562,359
COUPLING
Filed Dec. 11, 1944 2 Sheets-Sheet 1

INVENTOR.
Robert Iredell Jr.
BY
Evans & McCoy
ATTORNEYS

July 31, 1951  R. IREDELL, JR  2,562,359
COUPLING
Filed Dec. 11, 1944  2 Sheets-Sheet 2
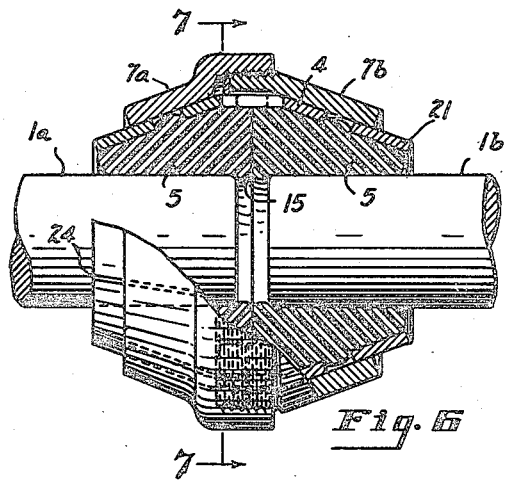
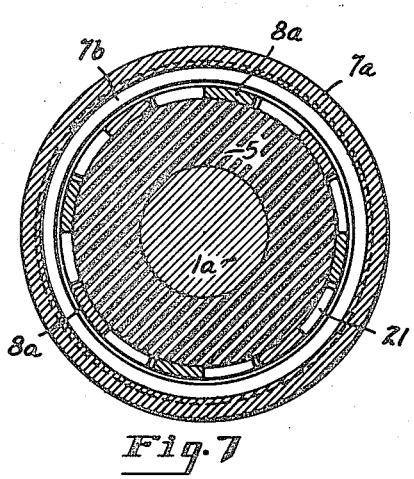
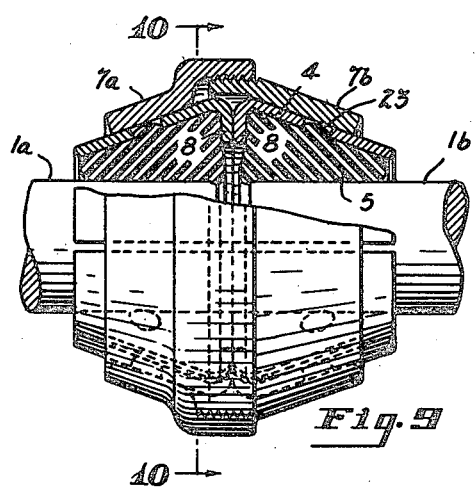
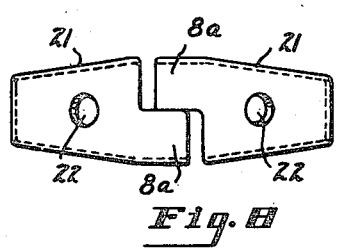
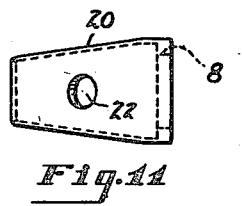
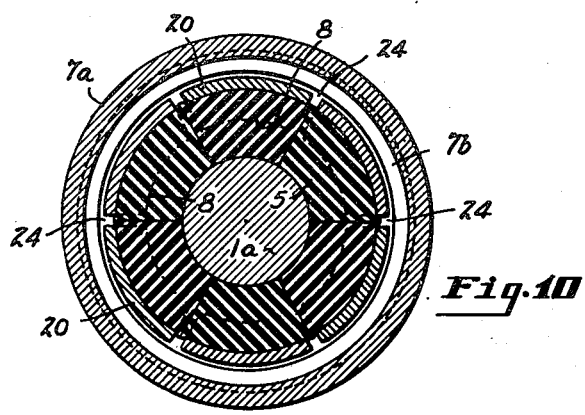
INVENTOR.
Robert Iredell Jr.
BY
Evans & McCoy
ATTORNEYS Patented July 31, 1951

2,562,359

UNITED STATES PATENT OFFICE 2,562,359

COUPLING

Robert Iredell, Jr., Wabash, Ind., assignor to The General Tire & Rubber Company, Akron, Ohio, a corporation of Ohio Application December 11, 1944, Serial No. 567,585

2 Claims. (Cl. 64—11)

This invention relates to flexible couplings and to a method of making the same. It particularly relates to flexible couplings between driven and driving members which permit a relatively wide angle of misalignment between the shafts of respective members.

It has been recognized that rubber and soft vulcanized rubbery polymers when maintained under high compression are capable of sustaining much greater unit loading, either when such loads are applied in direct compression or in a direction such that the rubber is deformed primarily by shearing stresses. It has heretofore been proposed to utilize tubular rubber under radial compression as a resilient coupling between driving and driven members. However, to obtain relatively low torsional windup under heavy loading and to prevent hunting between the driven and driving members, it is desirable to utilize the rubber in relatively thin radial section. Such a relatively thin section of rubber under substantial radial compression, however, is subjected to relatively excessive localized stresses when the shafts are not in substantial alignment and this defect has limited the field of use of such couplings.

It is an object of the present invention to provide flexible couplings which utilize only a relatively small amount of rubber initially under radial compression, but which permit coupling of rotating shafts which are in substantial misalignment.

It is an object of the present invention to provide a flexible shaft coupling which has relatively low torsional windup, which is capable of transmitting relatively high torque, and yet which permits substantial variation in alignment in the driven and driving members.

It is another object of the present invention to provide flexible shaft couplings which have the above-mentioned desirable properties of rubber under high radial compression, which permit relatively great misalignment without subjecting portions of the rubber to excessive or deteriorating strain, and which may be readily assembled together without special apparatus.

It is still another object of the present invention to provide a method of making flexible couplings which permit relatively wide angle distortion and which are capable of transmitting high torque without substantial windup.

Other objects will be apparent from the following description of the invention as illustrated by the accompanying drawings, in which:

Fig. 6 is a side elevational view with parts broken away of another modified form of coupling embodying the present invention;

Fig. 7 is a sectional view on the line 7—7 of Fig. 6;

Fig. 8 is a plan view of separate sections of a modified form of rigid outer member shown in the coupling of Fig. 6;

Fig. 9 is a side elevational view with parts broken away of still another modified form of coupling embodying the present invention;

Fig. 10 is a sectional view on line 10—10 of Fig. 9; and

Fig. 11 is a plan view of separate sections of a modified form of rigid outer member shown in the coupling of Fig. 9.

Figure 1:
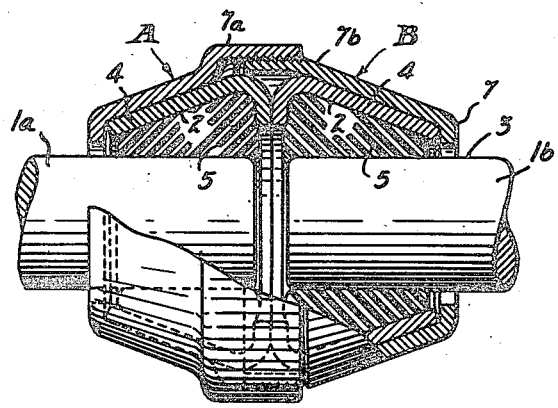
Figure 1 is an elevational view, partly in section, of a flexible coupling embodying the present invention.
Figure 2:
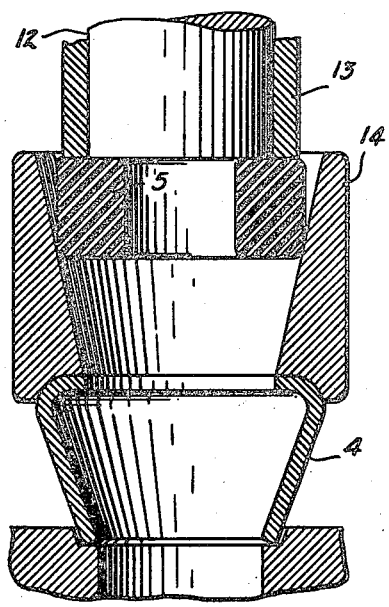
Fig. 2 is a vertical sectional view of a portion of the coupling embodying the present invention and of a portion of the apparatus which may be used in effecting its assembly, showing the first step in the assembly of resilient material within a tapered or frusto-conical, annular, rigid member.

The above objects are accomplished by utilizing as a torque-transmitting resilient member in couplings if the present invention an annular rubber member under a state of radial compression and having a longitudinal non-uniform thickness. The rubber member has substantially greater thickness adjacent the center of the coupling or adjacent the end portion of at least one of the shafts being coupled than at the edge of the coupling. Since a portion of the resilient material is of relatively thin section, that portion is capable of transmitting relatively high torque without appreciable annular distortion and the tendency for hunting between the shafts is reduced to a minimum. By having relatively great thickness near the end portion of the shaft where the greatest deflection due to shaft misalignment occurs, a great degree of misalignment between the shafts is readily taken care of without localized overheating of the rubber.

Referring more particularly to the drawing, in which like parts are designated by like numerals of reference throughout the several views, the couplings of the present invention have at least one portion A or B comprising an inner rigid member 1a or 1b, which may be a driven or driving shaft or a shaft portion making rigid connection with the same and which preferably has an outer cylindrical surface 3; an outer rigid member 4 with a longitudinally or axially tapered inner surface 2 at an angle to the outer surface 3 of the inner member; an annular resilient member 5, which is of rubberlike material, a soft vulcanized rubber or synthetic rubber compound and which has portions thereof under substantial radial compression between said inner and outer rigid members, and in adherent non-slipping union therebetween; and means such as a collar or housing portion 7 of said outer rigid member for connecting said outer rigid member to a shaft or outer rigid member of another portion. The outer rigid member may be annular, in one piece, as shown in Figs. 1 to 5, or it may comprise a plurality of annularly arranged, longitudinally separated sections held together by the housing portion 7a or 7b, as shown in Fig. 6 to Fig. 11 inclusive.

In accordance with the present invention, the separation between the inner and outer members of at least one portion A or B is variable in a longitudinal or axial direction, the maximum separation occurring near the end of the shaft or inner member. The resilient material 5 is in the deformed state in the coupling, wedge shaped in cross section, or has greater thickness adjacent the end portions 10 of the shaft or shaft portion where greatest strain is ordinarily had due to misalignment of driving and driven shafts.

The outer rigid member 4 is preferably tapered or has frusto-conical shape with an inturned portion 8 adjacent the widest end thereof to assist in retaining the formed resilient material in the desired shape prior to assembly of the portions of the couplings. Frictional means is preferably provided between the outer surface of the rigid member 4 carried by one shaft and a cooperating element carried by the other shaft, so that driving torque is not transmitted by the housing member 7. Thus, the outer face 9 of the inturned portion or lip portion 8 is preferably irregular, as may be obtained for example by knurling or the like, so that upon abutment with a corresponding inturned portion of a cooperating portion, no slippage will occur.

In the modification of Figure 1, the portions A and B carried by each of the driving and driven shafts 1a and 1b, respectively, are substantially identical. The portions 7a and 7b of the housing, which serve as means for exerting axial pressure against the outer rigid members 4 and thus connect the outer members 4 of one section in driven relation to the shaft of the second section, are threaded together.

Figure 4:
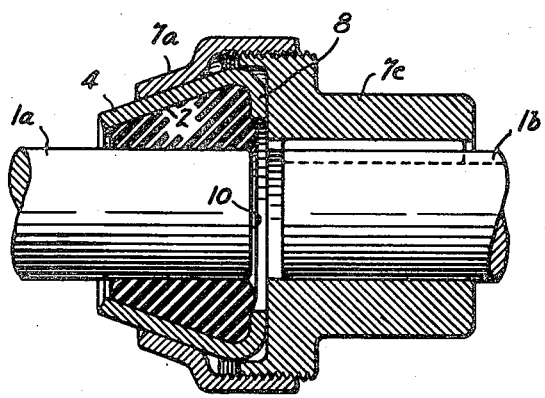
Fig. 4 is a vertical sectional view of a modified form of coupling embodying the present invention.

In the modification of Fig. 4, section B of Fig. 1 is substituted by a housing portion 7c, which is rigidly carried by the shaft 1b.

Figure 5:
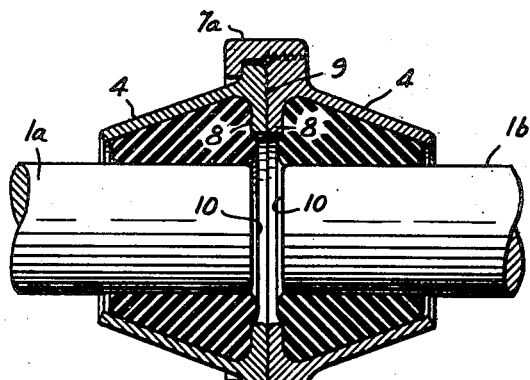
Fig. 5 is a vertical sectional view of another modified form of coupling embodying the present invention.

The modification of Fig. 5 is similar to that of Fig. 1 except that the housing portion 7a is threaded directly onto the outer rigid members 4 of one of the sections.

In the preparation of couplings embodying the present invention, the resilient member 5 may be assembled within the outer rigid member 4 and the shaft or inner member 1a, assembled in concentric relation in substantially the same manner as set forth in the Thiry Patent 1,782,770. Thus, referring to Figs. 2 and 3, the resilient member 5, which may have a rectangular or oblong cross section and which preferably has a volume sufficiently large to fill the space between the outer surface 3 of the shaft or inner member and the inner surface 2 of the outer rigid member of the coupling, is forced by suitable means such as a plunger 12. The plunger 12 slides within the guides 13 through a tapered path within the guide 14 into the outer member 4. The diameter of the bore 15 within the annular resilient member 5, while disposed within the outer member 4, is substantially less than the outer diameter of the outer surface 3 of the shaft or inner member.

The shaft or inner member 3 is preferably provided with a tapered leader 16, the smallest end of which is sufficiently small to enter into the bore 15 and the largest end of which may be approximately equal to the diameter of the outer surface 3. By relative axial movement between the member 4 and the resilient material 5 within the outer member 4, the outer surface of the inner member 3 may be readily disposed within the bore 15 of the resilient material 5 concentric with the inner surface 2 of the rigid member 4, thus causing substantial deformation of the resilient material and a firm non-slipping union between the surface of the inner member and the inner surface of the outer member.

Figure 3:
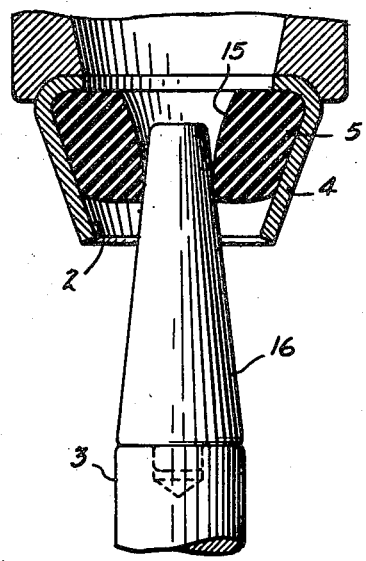
Fig. 3 is a vertical sectional view through a portion of the coupling members and a portion of apparatus used in the assembling of the coupling on the shaft, showing the second step in the assembling operation.

A lubricant which is readily adsorbed by the resilient material 5 or a rubber-to-metal adhesive may be applied between the surface 3 or the surface of the leader member and the resilient material 5 during the assembly operation. The outer member 4 may also be adhesively bonded to the resilient material 5 and, if desired, the resilient material 5 may be molded and cured within the outer member 4 substantially as shown in Fig. 3. In such case the internal bore 15 of the mold member should be substantially smaller than the shaft or inner member.

If desired, the outer rigid member 4 may also comprise a plurality of longitudinal sections adhesively bonded or otherwise attached to the annular resilient member 5 at an external surface thereof. If the member 4 comprises a substantial number of sections attached only over a portion of their width to the resilient member 5, the resilient material and the outer rigid member 4 may be applied over the shaft or inner member by simply stretching the resilient member 5 to enlarge its internal bore and cause separation of the respective sections of the rigid member 4. The resilient material may then be compressed within a collar or housing portion 7a, similar to that illustrated in Fig. 4, radial compression being obtained by relative slippage of the members 7a and 4 during the threading of the collar on the member 7c.

Since the thickness of the resilient material 5 is adjacent the ends 10 of the shaft upon which are carried, it is seen that greater ease of flow of resilient material or ease of distortion is had adjacent the ends of the shaft and failure due to substantial misalignment is therefore less likely.

In the modification of Figs. 6 and 7, the outer member 4 is made up of a plurality of circumferentially spaced, generally wedge-shaped sections 21 which may be sectors of a frustum of a cone. The sectors 21 are disposed over the annular rubber member 5 to which they may be attached by suitable attaching means, such as rubber-to-metal adhesion or the opening 22 and the coacting protuberances 23 circumferentially spaced in the outer tapered surface of the rubber member 5. The rubber member 5 may be molded or otherwise suitably formed with a bore 15 of smaller diameter than the shaft 1a or 1b over which it is stretched. When the rubber is in the unstretched condition, the side edges of adjacent sectors 21 may contact each other. However, when the number and size of sectors are chosen so that the rubber 5 is in position over the shaft, a longitudinal space 24 is provided between adjacent sectors. Thus, the outer member 4 may be substantially compressed by the respective housing members 7a and 7b as they are tightened together to strongly compress the rubber member 5 against the shaft.

When the sectors 21 are bonded to the rubber member 5, it is preferred that the bonded portion cover only a single relatively small portion (preferably a central portion) of the surface of each sector so that more uniform stretch and compression of the rubber member may be had. The sectors 21 may be provided with suitable interlocking means such as the projections 8a to cooperate with interlocking means of similar sections or against a rigid surface of the cooperating portion of the coupling.

In the modifications shown in Figs. 9 and 10, the rigid member is similarly made up of a plurality of rigid sections 20 circumferentially spaced and circumferentially arranged to provide a longitudinal, tapered annular inner surface and a longitudinal, tapered annular outer surface substantially concentric with the outer surface of the inner member, such as the shafts 1a or 1b.

In the section 20, the interlocking means is an inturned portion 8 which serves to bear against a portion of a similar section or rigid surface of another portion of the housing.

Although several embodiments of the invention have been herein shown and described, it will be understood that numerous modifications of the construction shown may be resorted to without departing from the spirit of this invention as defined in the appended claims.

What I claim is:

1. A flexible coupling for making connection between two rotatable members, at least one of which is a shaft, said coupling comprising an annulus of resilient material disposed over a cylindrical surface rigid with said shaft, a plurality of spaced, generally frusto-conical sectors circumferentially arranged and circumferentially spaced from each other and bearing against said resilient annulus to provide a series of longitudinally tapered outer surfaces spaced about a circumference substantially concentric with said outer cylindrical surface of said inner member, means bearing against said tapered outer surfaces of said sectors for compressing said sectors against said resilient material to cause said resilient material to be compressed between said rigid cylindrical surface and the inner surface of said sectors, and means for connecting said sectors to the other of said rotatable members.

2. A flexible coupling for making connection between two rotatable members, at least one of which is a shaft, said coupling comprising an annulus of resilient material disposed over a cylindrical surface rigid with said shaft, a plurality of spaced sectors circumferentially arranged and circumferentially spaced from each other and bearing against said resilient annulus to provide a series of longitudinally tapered outer surfaces spaced about a circumference substantially concentric with said outer cylindrical surface of said inner member, means bearing against said tapered outer surfaces of said sectors for compressing said sectors against said resilient material to cause said resilient material to be compressed between said rigid cylindrical surface and the inner surface of said sectors, and means for connecting said sectors to the other of said rotatable members.

ROBERT IREDELL, Jr.

REFERENCES CITED

The following references are of record in the file of this patent:

UNITED STATES PATENTS

| Number | Name | Date |
| --- | --- | --- |
| 1,883,203 | Whitehouse | Oct. 18, 1932 |
| 2,084,761 | Bradley | June 22, 1937 |
| 2,146,766 | Ricefield | Feb. 14, 1939 |
| 2,247,163 | Bradley | June 24, 1941 |
| 2,295,316 | Yates | Sept. 8, 1942 |